US010191637B2

(12) United States Patent
Jayaraman (10) Patent No.: US 10,191,637 B2
(45) Date of Patent: Jan. 29, 2019

(54) WORKSPACE METADATA MANAGEMENT (71) Applicant: Hewlett-Packard Development Company, L.P., Houston, TX (US)

(72) Inventor: Karthik Jayaraman, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/501,270

(22) PCT Filed: Aug. 4, 2014

(86) PCT No.: PCT/US2014/049648
§ 371 (c)(1),
(2) Date: Feb. 2, 2017

(87) PCT Pub. No.: WO2016/022096
PCT Pub. Date: Feb. 11, 2016

(65) Prior Publication Data
US 2017/0220235 A1    Aug. 3, 2017

(51) Int. Cl.
*G06F 3/0484* (2013.01)
*H04N 5/92* (2006.01)
*H04N 5/445* (2011.01)
*H04N 5/232* (2006.01)
*G06F 17/30* (2006.01)
*G06F 3/0488* (2013.01)

(52) U.S. Cl.
CPC ........ *G06F 3/04845* (2013.01); *G06F 3/0488* (2013.01); *G06F 17/3028* (2013.01); *G06F 17/30274* (2013.01); *H04N 5/23293* (2013.01); *H04N 5/44504* (2013.01); *H04N 5/9201* (2013.01); *G06F 2203/04808* (2013.01)

(58) Field of Classification Search
CPC .............................. G06F 3/0425; G06F 1/1692
See application file for complete search history.

(56) References Cited

U.S. PATENT DOCUMENTS 5,394,521 A    2/1995  Henderson et al.
6,247,024 B1   6/2001  Kincaid
(Continued)

FOREIGN PATENT DOCUMENTS

WO    WO-2013/019252 A1 *  2/2013
WO    WO-2013/019255 A1 *  2/2013

OTHER PUBLICATIONS

1 Introduction to Workspace Manager, Oracle Database Application Developer's Guide—Workspace Manager 10g Release 2 (10.2), Aug. 3, 2004, pp. 1-38, Oracle.
(Continued)

*Primary Examiner* — Jeffery A Brier
(74) *Attorney, Agent, or Firm* — HP Inc. Patent Department (57) ABSTRACT Examples of workspace metadata management are disclosed. One example implementation according to aspects of the present disclosure may include a computing system to display a workspace on a display. The computing system is further to project an image having metadata onto a multi-touch surface to receive a touch input, the image being an asset associated with a project of the workspace. The computing system is also to manage the workspace.

15 Claims, 7 Drawing Sheets

(56) References Cited

U.S. PATENT DOCUMENTS

| | | |
|---|---|---|
| 7,451,406 B2 | 11/2008 | Yoon |
| 8,707,197 B2 | 4/2014 | Toyama et al. |
| 2004/0104931 A1 | 6/2004 | Schmitt |
| 2007/0073776 A1 | 3/2007 | Kalalian et al. |
| 2009/0249337 A1 | 10/2009 | Vasilevsky et al. |
| 2009/0307598 A1 | 12/2009 | Giles |
| 2012/0331415 A1 | 12/2012 | Hillis et al. |
| 2013/0086483 A1 | 4/2013 | Vainer et al. |
| 2013/0113920 A1* | 5/2013 | Blanton .................. G06K 9/00 348/135 |
| 2014/0139717 A1* | 5/2014 | Short ..................... H04N 7/142 348/333.1 |
| 2014/0176735 A1* | 6/2014 | Short ................ H04N 1/00267 348/207.1 |

OTHER PUBLICATIONS

Nview Desktop Management Software, May 2, 2013, pp. 1-2, NVIDIA Corporation, Available at: <nvidia.in/object/nvidia-nview-desktop-management-software-in.html>.

* cited by examiner

```
<?xml version="1.0" encoding="utf-8"?>
<Workspace xmlns:xsd="http://www.w3.org/2001/XMLSchema"
 xmlns:xsi="http://www.w3.org/2001/XMLSchema-instance">
  <Name>Workspace</Name>
  <ProjectNameList>
    <ProjectName>9f62332e-b9f7-4252-a55e-990fbaf93635</ProjectName>
  </ProjectNameList>
  <ActiveProjectName>9f62332e-b9f7-4252-a55e-990fbaf93635</ActiveProjectName>
  <WorkspaceSettings />
</Workspace>
```

FIG. 7A

```
<?xml version="1.0" encoding="utf-8"?>
<Project xmlns:xsd="http://www.w3.org/2001/XMLSchema"
 xmlns:xsi="http://www.w3.org/2001/XMLSchema-instance">
  <Name>9f62332e-b9f7-4252-a55e-990fbaf93635</Name>
  <DisplayName>Hello1Project</DisplayName>
  <PackageType>Project</PackageType>
  <PackageVersion>1.0</PackageVersion>
  <ApplicationVersionPublished>1.0</ApplicationVersionPublished>
  <IsPermanentCopyAvailable>true</IsPermanentCopyAvailable>
  <ProjectPageNameList>
    <ProjectPageName>32ef4292-2b68-4601-b72e-5fa2b3a5ce97</ProjectPageName>
  </ProjectPageNameList>
  <ActiveProjectPageName>32ef4292-2b68-4601-b72e-5fa2b3a5ce97</ActiveProjectPageName>
  <ProjectSettings>
  </ProjectSettings>
  <FilesMarkedForDeletion>
  </FilesMarkedForDeletion>
</Project>
```

WORKSPACE METADATA MANAGEMENT

BACKGROUND

Many computing devices and other electronic devices, such as mobile phones, desktop and laptop computers, tablets, digital cameras, and other similar devices are capable of capturing and displaying electronic images. As such, the number of digital images continues to increases. Users may desire to view and interact with these digital images through the computing devices.

BRIEF DESCRIPTION OF THE DRAWINGS

The following detailed description references the drawings, in which:

FIG. 7A illustrates a workplace metadata XML structure, FIG. 7B illustrates a project metadata XML structure.

DETAILED DESCRIPTION

Image manipulation continues to be a desirable feature to users of computing devices and other electronic devices capable of capturing and displaying electronic images. For example, a user of a computing device may desire to capture an electronic image of an object (or upload a previously captured, existing electronic image) and then manipulate the resulting electronic image. Current implementations of image manipulation techniques are not optimized for a multi-touch environment and/or a multi-display and projected environment. Moreover, managing metadata relating to image capture and image manipulation is desirable.

Various implementations are described below by referring to several examples of workspace metadata management in a multi-touch surface and a multi-display with projection environment. One example implementation according to aspects of the present disclosure may include a computing system to display a workspace on a display. The computing system is further to project an image having metadata onto a multi-touch surface to receive a touch input, the image being an asset associated with a project of the workspace. The computing system is also to manage the workspace. Other example implementations of workspace metadata management in a multi-display with projection onto multi-touch surface environment are described below.

In some implementations, the following advantages may be realized: to enable a computing application to automatically create and manage multiple workspaces, projects and project pages per operating system user login; to enable a computing application to automatically load and save projects containing a creative asset from a location hidden from users; to enable a multi-display and projected computing application to automatically save contour data of captured image for referencing when the corresponding image is loaded from a storage location and imported to a user's creative project; and to enable a multi-display and projected computing application to automatically manage disk space and memory for better performance and optimization. Further advantages may include: to enable a multi-display and projected computing application to automatically save metadata related to a users project when an action is performed by the customer; to enable a multi-display and projected computing application to automatically restore the state of the application after a failure; to enable a multi-display and projected computing application to automatically load the last active project or creative asset state the next time a user launches the application; to enable a multi-display and projected computing application to store per operating system user login workspace settings and per project settings; and to enable a multi-display and projected computing application to delay the deletion of unwanted assets from a project to optimize undo and/or redo functions. These and other advantages will be apparent from the description that follows.

Figure 1:
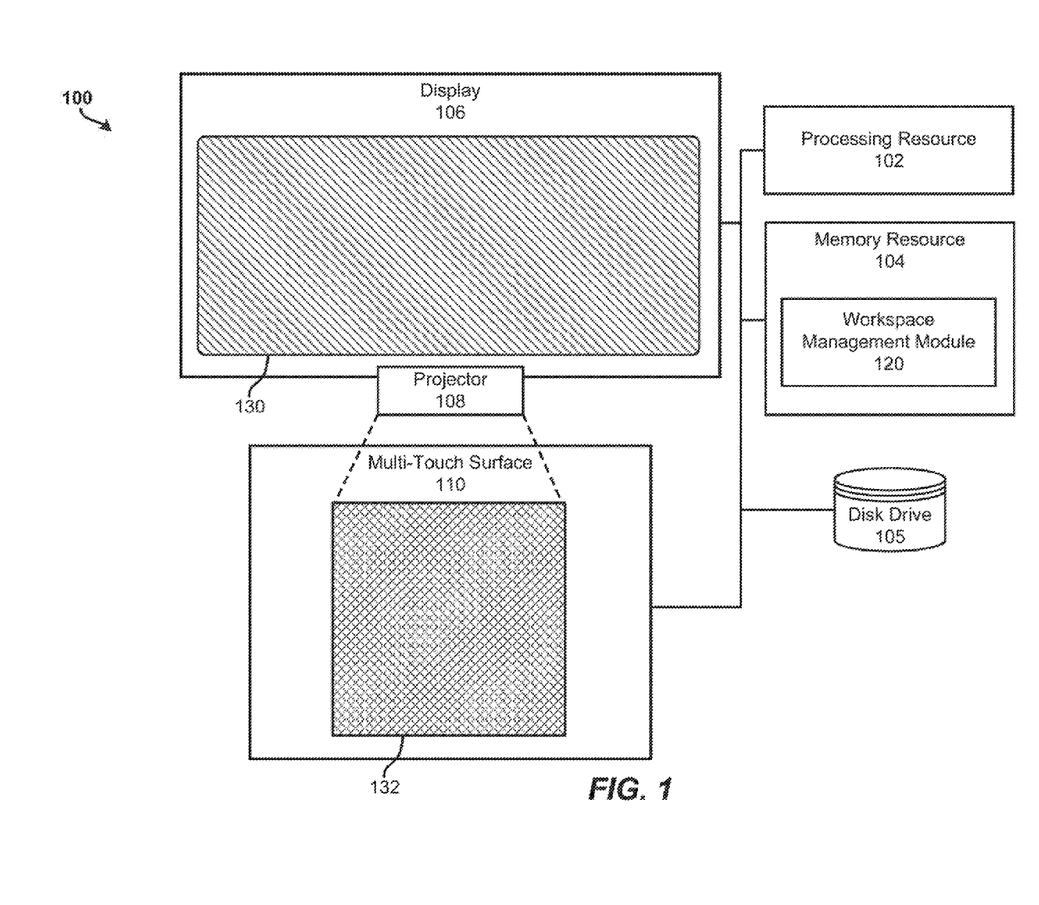
FIG. 1 illustrates a computing system to store image project metadata in a multi-display with projection onto multi-touch surface environment according to examples of the present disclosure.
Figure 2:
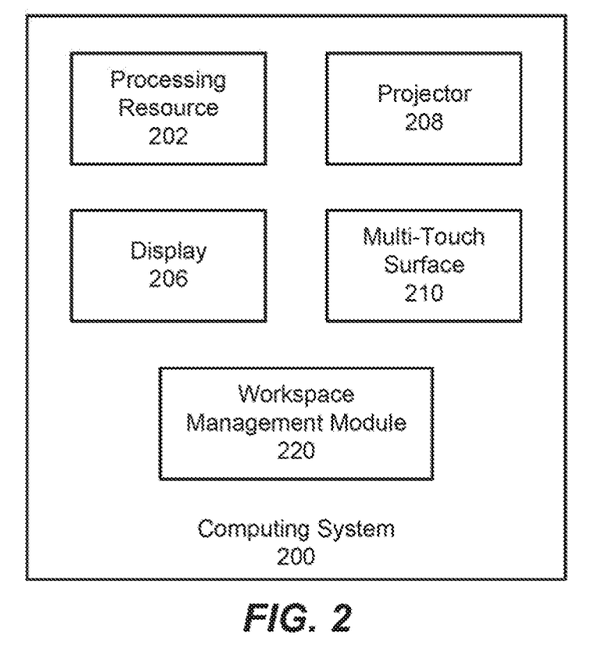
FIG. 2 illustrates a computing system to store image project metadata in a multi-display with projection onto multi-touch surface environment according to examples of the present disclosure.
Figure 3:
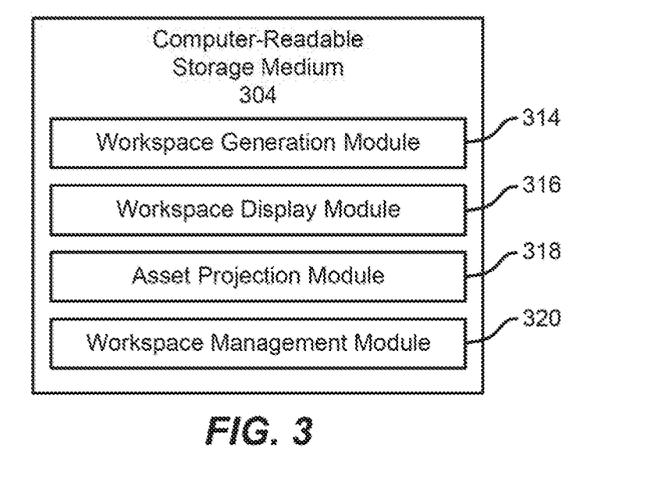
FIG. 3 illustrates a computer-readable storage medium storing instructions to store image project metadata in a multi-display with projection onto multi-touch surface environment according to examples of the present disclosure.

FIGS. 1-3 include particular components, modules, etc. according to various examples as described herein. In different implementations, more, fewer, and/or other components, modules, arrangements of components/modules, etc. may be used according to the teachings described herein. In addition, the various components, modules, etc. presently described may be implemented as one or more software modules, hardware modules, special-purpose hardware (e.g., application specific hardware, application specific integrated circuits (ASICs), embedded controllers, hardwired circuitry, etc.), or some combination of these.

Generally, FIGS. 1-3 relate to components and modules of a computing system, such as computing system 100 of FIG. 1 and computing system 200 of FIG. 2. It should be understood that the computing systems 100 and 200 may include any appropriate type of computing system and/or computing device, including for example smartphones, tablets, desktops, laptops, workstations, servers, smart monitors, smart televisions, digital signage, scientific instruments, retail point of sale devices, video walls, imaging devices, peripherals, networking equipment, or the like.

FIG. 1 illustrates a computing system 100 to store image project metadata in a multi-display with projection onto multi-touch surface environment according to examples of the present disclosure. The computing system 100 may include a processing resource 102 that represents generally any suitable type or form of processing unit or units capable of processing data or interpreting and executing instructions. The processing resource 102 may be one or more central processing units (CPUs), microprocessors, and/or other hardware devices suitable for retrieval and execution of instructions. The instructions may be stored, for example, on a non-transitory tangible computer-readable storage medium, such as memory resource 104 (as well as memory resource 204 of FIG. 2 and/or computer-readable storage medium 304 of FIG. 3), which may include any electronic, magnetic, optical, or other physical storage device that store executable instructions. Thus, the memory resource 104 may be, for example, random access memory (RAM), electrically-erasable programmable read-only memory (EPPROM), a storage drive, an optical disk, and any other suitable type of volatile or non-volatile memory that stores instructions to cause a programmable processor to perform the techniques described herein. In examples, memory resource 104 includes a main memory, such as a RAM in which the instructions may be stored during runtime, and a secondary memory, such as a nonvolatile memory in which a copy of the instructions is stored.

Alternatively or additionally, the computing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processing resources (or processing resources utilizing multiple processing cores) may be used, as appropriate, along with multiple memory resources and/or types of memory resources. The computing system 100 may also include a disk drive or other storage device for storing data such as disk drive 105. The disk drive 105 may be any suitable data storage device including a hard disk storage device, an optical disk storage device, a magnetic storage device, a flash storage device, or any other suitable storage device or combination thereof.

In addition, the computing system 100 may include a display 106, a projector 108, and a multi-touch surface 110. As used throughout the present disclosure, the combination of the display 106, the projector 108, and the multi-touch surface 110 may be an example of a mufti-display with projection onto multi-touch surface environment.

The display 106 represents generally any combination of hardware and programming configured to exhibit or present a message, image, view, or other presentation for perception by a user of the computing system 100. In examples, the display 106 may be or include a monitor, a touchscreen, a projection device, and/or a touch/sensory display device. The display 106 may display text, images, and other appropriate graphical content. In the example shown in FIG. 1, the display 106 displays a workspace 130.

The projector 108 may be any suitable type of projection device to display an electronic image by projecting the image onto a surface such as multi-touch surface 110. The projector 108 may be integrated into the display 106 in examples, or the projector 108 may be a separate component communicatively coupled to the computing system 100. It should be understood that, in other examples, the functionality of the projector 108 and the multi-touch surface 110 may be combined into a singular device, such as a multi-touch display that is capable of displaying an image and receiving a multi-touch input. In examples, the display 106 is in an approximate vertical orientation and the multi-touch surface 110 is in an approximate horizontal position.

The multi-touch surface 110 may be any suitable type of input-receiving device to receive a touch input from a user. For example, the multi-touch surface 110 may be a track pad, touchscreen, or other device to recognize the presence of one or more points-of-contact with the multi-touch surface 110. The points-of-contact may include touches from a stylus, electronic pen, user finger, or other suitable source. The multi-touch surface 110 may receive multi-touch gestures, such as "pinch-to-zoom," multi-touch scrolling, multi-touch taps, multi-touch rotation, and other suitable gestures, including user-defined gestures. In the example shown, the projector 108 projects an asset 132 onto the multi-touch surface 110. The asset 132 may be any suitable graphical or textual content, such as an image, text, a chart, a graph, an animation, or appropriate combinations thereof. When the projector 108 projects the asset 132 onto the multi-touch surface 110, it may also project an image editor interface (not shown). The image editor interface may provide additional options, as discussed below, such as background removal buttons (e.g., "keep" and "remove" buttons), process buttons (e.g., "undo" and "redo" buttons), and manipulation buttons (e.g., "scale," "rotate," and "move" buttons). The image editor interface may also provide an "accept" option to accept the modified asset 132 after image manipulation has been performed.

In addition to the hardware components described, the computing system 100 may include a workspace management module 120. In examples, the modules described herein may be a combination of hardware and programming. The programming may be processor executable instructions stored on a computer-readable storage medium or tangible memory resource such as the memory resource 104, and the hardware may include the processing resource 102 for executing those instructions. Thus memory resource 104 can be said to store program instructions that when executed by the processing resource 102 implement the modules described herein. Other modules may also be utilized as will be discussed further below in other examples.

The workspace management module 120 is executable by the processing resource 102 to manage the workspace. More specifically, the workspace management module manages the workspace by managing workspace metadata as well as project metadata, project page metadata, and asset metadata. Each workspace may include projects, which in turn may include project pages. The project pages have associated assets, such as images, text, and other graphical content. The workspace 130 (also referred to simply as "workspace") may be an interface to display the workspace and any associated projects, project pages, and/or assets. The workspace management module 120 is further described below with reference to FIG. 2.

FIG. 2 illustrates a computing system to store image project metadata in a multi-display with projection onto multi-touch surface environment according to examples of the present disclosure. Similarly to the computing system 100 of FIG. 1, the example computing system 200 of FIG. 2 includes a processing resource 202, a display 206, a projector 206, and a multi-touch surface 210. Throughout the discussion of FIG. 2, reference to components, modules, and/or features of FIG. 1 may be included. However, such reference should not intended to be, and should not be construed as, limiting.

Additionally, the computing system 200 includes a workspace management module 220. The workspace management module 220 (as well as any additional modules) may be stored, for example, in a computer-readable storage medium such as a memory or computer-readable storage medium, or the modules may be implemented using dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

The workspace management module 120 manages the workspace by managing workspace metadata as well as project metadata, project page metadata, and asset metadata. When the workspace (e.g. workspace 130 of FIG. 1) is initialized, a disk drive 105 or other data storage location may be scanned for the presence of workspace, project, project page, and asset metadata, which may be in serialized form. If none is found, a hierarchy of files/folders known as workspaces, projects, and project pages is generated in a location that may be unknown to or hidden from a user of the workspace.

A workspace is a collection or container of projects. The workspace also contains workspace metadata. Each project within the workspace is a collection of project pages, assets, and project metadata. Each project page stores a collection of asset metadata to save and restore the state of the asset when the workspace is loaded and/or re-loaded.

Figure 7A:
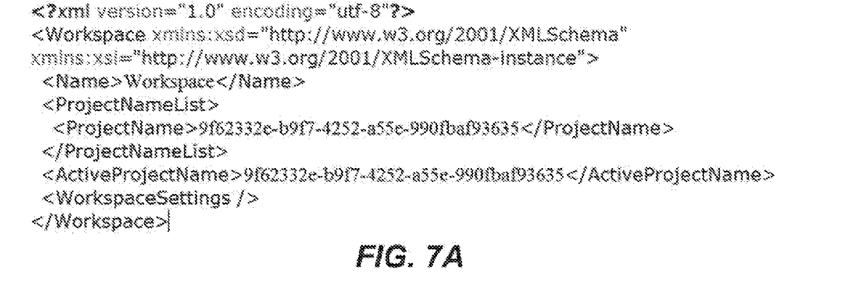

A workspace metadata file, which may be an extensible markup language (XML) file, contains a list of projects associated with the workspace, workspace settings, and the last active project. An example of the workspace metadata file structure is illustrated in FIG. 7A. A globally unique identifier may be automatically assigned an internal name for a project of the workspace. The first default project automatically created is the active project initially (that is, active to the user).

Figure 7B:
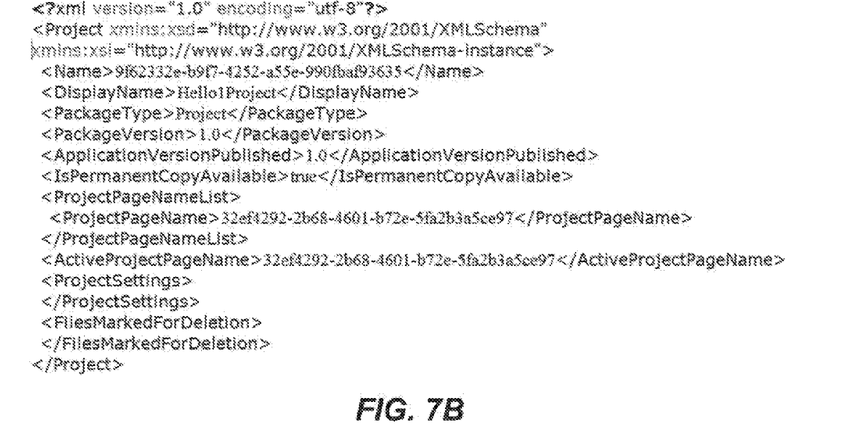
Figure 7C:
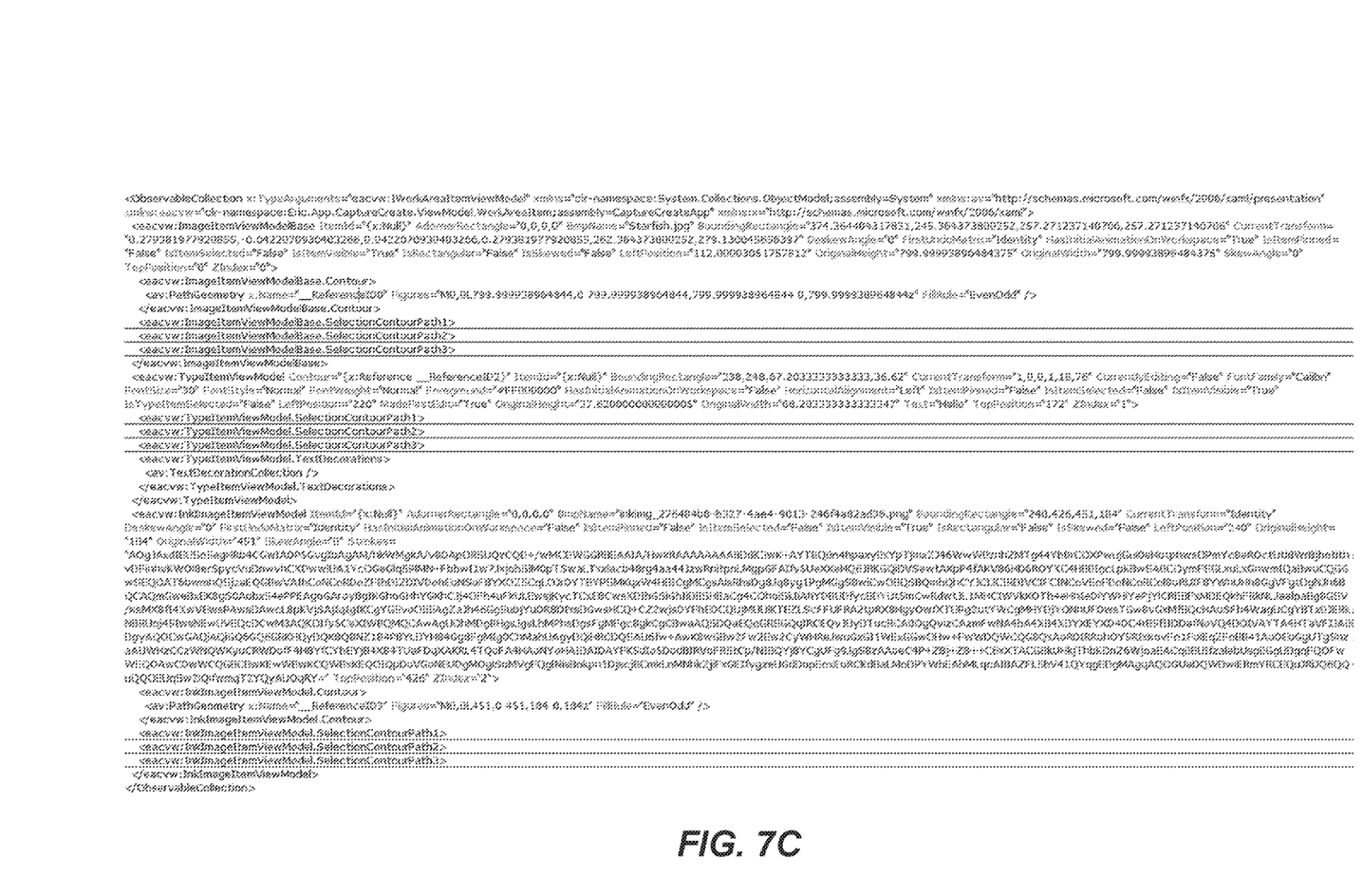
FIG. 7C illustrates a project page metadata XML structure, each according to examples of the present disclosure.

A project metadata XML file, as illustrated in FIG. 7B, contains metadata of the project, a list of project pages, the active project page, project related settings (i.e., canvas type/size, files marked for deletion, etc.). When a user creates electronic ink, text, and/or graphical images on the multi-touch surface 210, the metadata and related state information is captured in a project page metadata file as shown for example in FIG. 7C. For example, if an image is imported to the workspace via a capture process (such as by using a capture device that may, in examples, be associated with or part of the projector 108), contour metadata relating to the captured image is stored in the project page XML file. The contour metadata may also be stored in a captured image metadata XML file, for example, using a hash such as SHA256. The contour metadata is a representation of the x-axis and y-axis coordinates in relation to the object's position relative to the multi-touch surface 110. The captured image metadata XML file is referenced when an image is selected on the display 106 from the workspace 130 to be projected onto the multi-touch surface 110. If the name of the selected image matches that in the captured image metadata XML store, then the hash of the file is computed and verified against the stored hash value. In this way, image tampering or modification can be detected. If the hash match is successful (that is, if the hash values match), then corresponding contour metadata is also attached with the loaded image 132 and is projected onto the multi-touch surface 210 by the projector 208.

After certain user actions, like selecting an image from the display 206 to be projected by projector 208 onto multi-touch surface 210, creation of electronic ink, text, or image manipulation, the state of the current project is serialized or stored to the disk drive 105. If a deletion of an asset occurs, the actual deletion of the asset may be delayed and marked for deletion such that deletion occurs when the workspace is closed or otherwise terminated. In this way, performance is improved for undo and redo actions. For example, if a user performs an undo to a deletion action, the corresponding asset is loaded from disk drive 105 quickly from the same location since it has not yet been deleted.

Figure 8:
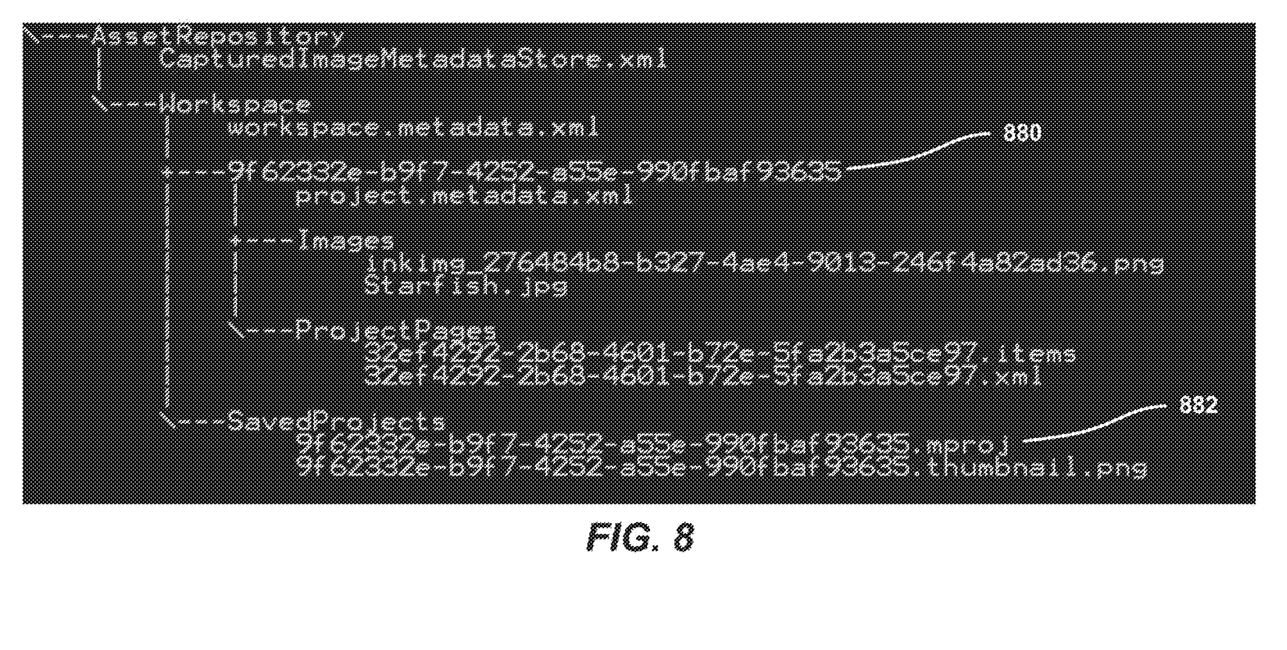
FIG. 8 illustrates a screenshot of an asset repository structure on a disk drive, the asset repository structure having a temporary working area and a permanent working area according to examples of the present disclosure.

During a save of the project of the workspace, the user may enter a project name. The project, including associated project pages, is copied to a temporary storage location as shown in FIG. 8. Specifically, FIG. 8 illustrates a screenshot of an asset repository structure on a disk drive 105, the asset repository structure having a temporary working area 880 and a non-temporary working area 882 according to examples of the present disclosure. The project may also be compressed and stored for later use. An image rendering of the workspace may be captured and stored as a project thumbnail to be shown later, such as when displaying workspaces/projects from which the user may select. When a new project is created in a workspace or another project is loaded from the saved projects into the workspace, any assets marked for deletion of the active project are then deleted. The newly loaded project becomes the active project. In examples, to increase efficiency of use of disk drive 105, assets of the active project are maintained in the temporary working area 880 while assets of other projects (i.e., non-active projects) are removed from the temporary working area 880 and are archived to the non-temporary working area 882.

In examples, a project may exist in two different forms: in the temporary working area 880 and in the non-temporary working area 882. If a user initiates a save command to save an active project, the changes are committed or saved in the non-permanent working area 882. However, non-user-triggered actions that may initiate a save may result in the changes to the active project being saved to the temporary working area 880. If an active project is terminated by the user and then the workspace and project are re-opened or re-launched, the project in the temporary working area 880 is loaded. This may be useful to automatically restore the state of the workspace and project in the event of a software failure.

The workspace 130 shown in FIG. 1 may display a list of projects stored in the non-temporary working area 882. A user may select a project to be loaded such that the user may preform actions on the assets within the project. Once selected, the now active project is projected onto the multi-touch surface 210. The project is then uncompressed and loaded from the non-temporary working area 882 into memory such as memory resource 104.

In examples, multiple projects in a workspace could be managed in parallel. Multiple project pages in a project could be managed as part of a project page list displayed to the user on the display 206. When the workspace launches, a list of projects metadata of saved projects is loaded and is displayed, such as in thumbnail preview format, in the workspace 130 on the display 206. The user may then select which projects and project pages to load.

Assets (e.g., images, text, etc.) may also be captured by a capture device (not shown). Metadata relating to the captured image may be extended to represent a user interface object on the multi-touch surface 210. The metadata information for the captured asset may be stored in the disk drive 105 for later retrieval.

The workspace management module 220 automatically manages projects, for example, by scanning a list of orphaned projects on the disk drive 105 and deleting them on launch of the workspace. A project is orphaned if the temporary working area is available, it is not saved permanently, and it is not the active project. If a user is working on a project which is active and, while closing the application, chooses not to save the project permanently, then internally, the active project is "orphaned" and a new empty is project is created. In this way, the next time a user launches the workspace, an empty project is available for the customer to use.

FIG. 3 illustrates a computer-readable storage medium storing instructions to store image project metadata in a multi-display with projection onto multi-touch surface environment according to examples of the present disclosure. The computer-readable storage medium 304 is non-transitory in the sense that it does not encompass a transitory signal but instead is made up of one or more memory components configured to store the instructions. The computer-readable storage medium may be representative of the memory resource 104 of FIG. 1 and may store machine executable instructions in the form of modules, which are executable on a computing system such as computing system 100 of FIG. 1 and/or computing system 200 of FIG. 2.

In the example shown in FIG. 3, the modules may include a workspace generation module 314, a workspace display module 316, an asset projection module 318, and a workspace management module 320. The modules of the computer-readable storage medium 304 may be executable so as to perform the techniques described herein, including the functionality described regarding the method 400 of FIG. 4. The functionality of these modules is described below with reference to the functional blocks of FIG. 4 but should not be construed as so limiting.

Figure 4:
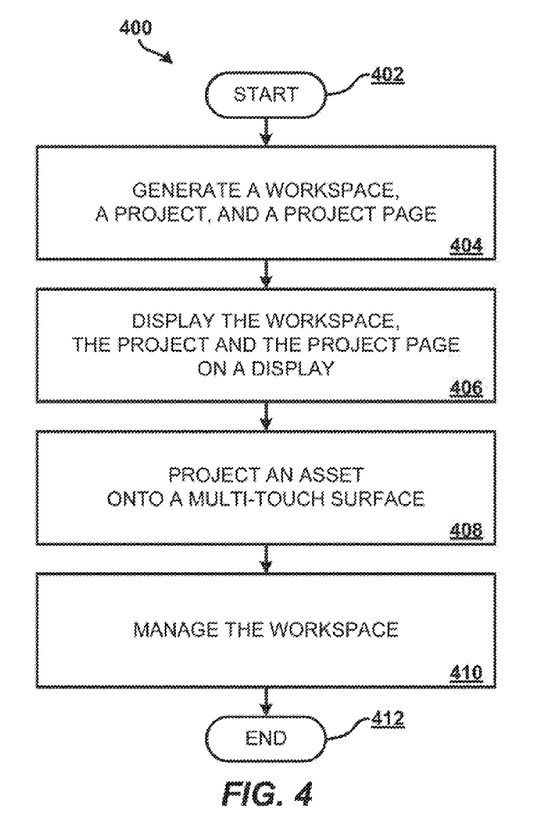
FIG. 4 illustrates a flow diagram of a method for storing image project metadata in a multi-display with projection onto multi-touch surface environment according to examples of the present disclosure.

In particular, FIG. 4 illustrates a flow diagram of a method 400 for storing image project metadata in a multi-display with projection onto multi-touch surface environment according to examples of the present disclosure. The method 400 may be stored as instructions on a non-transitory computer-readable storage medium such as computer-readable storage medium 304 of FIG. 3 or another suitable memory such as memory resource 104 of FIG. 1 that, when executed by a processor (e.g., processing resource 102 of FIG. 1 and/or processing resource 202 of FIG. 2), cause the processor to perform the method 400. It should be appreciated that the method 400 may be executed by a computing system or a computing device such as computing system 100 of FIG. 1 and/or computing system 200 of FIG. 2 or by another suitable computing system.

At block 402 of method 400, the method 400 begins and continues to block 404. At block 404 of method 400, the workspace generation module 314 generates a workspace, a project, and a project page. The project page may be one of multiple project pages associated with a project. Similarly, the project may be one of multiple projects associated with a workspace. The workspace may be associated with a user of the computing system (e.g., computing system 100 of FIG. 1 and/or computing system 200 of FIG. 2) such that, in examples, each user may have his own workspace. The method 400 continues to block 406.

At block 406 of method 400, the workspace display module 316 displays the workspace, the project, and the project page on a display (e.g., display 106 of FIG. 1 and/or display 206 of FIG. 2). The method 400 continues to block 408.

At block 408 of method 400, the asset projection module projects an asset onto a multi-touch surface. The multi-touch surface may receive a touch input, multi-touch input, and/or gesture to cause the asset projected on the multi-touch surface to be manipulated. The asset is associated with the project page of the project of the workspace. In examples, the asset may include an image, text, electronic ink, graphs, charts, animations, or other graphical and/or textual representations. The method 400 continues to block 410.

At block 410 of method 400, the workspace management module 320 manages the workspace, the project, and the project page. In examples, the computing system manages the workspace by managing workspace metadata as well as project metadata, project page metadata, and asset metadata. The method continues to block 412, at which point the method 400 ends.

Additional processes also may be included, and it should be understood that the processes depicted in FIG. 4 represent illustrations, and that other processes may be added or existing processes may be removed, modified, or rearranged without departing from the scope and spirit of the present disclosure.

Figure 5:
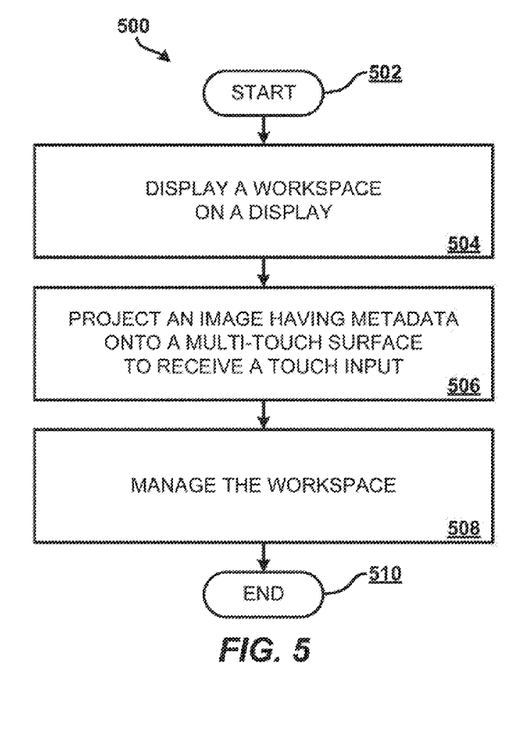
FIG. 5 illustrates a flow diagram of a method for storing image project metadata in a multi-display with projection onto multi-touch surface environment input according to examples of the present disclosure.

FIG. 5 illustrates a flow diagram of a method 500 for storing image project metadata in a multi-display with projection onto multi-touch surface environment input according to examples of the present disclosure. The method 500 may be executed by a computing system or a computing device such as computing system 100 of FIG. 1 and/or computing system 200 of FIG. 2. The method 500 may also be stored as instructions on a non-transitory computer-readable storage medium such as computer-readable storage medium 304 of FIG. 3 that, when executed by a processor (e.g., processing resource 102 of FIG. 1 and/or processing resource 202 of FIG. 2), cause the processor to perform the method 500.

At block 502, the method 500 begins and continues to block 504. At block 504, the method 500 includes the computing system (e.g., computing system 100 of FIG. 1 and/or computing system 200 of FIG. 2) displaying a workspace (e.g., workspace 130 of FIG. 1) on a display (e.g., display 106 of FIG. 1 and/or display 206 of FIG. 2). The method continues to block 506.

At block 506, the method 500 includes the computing system (e.g., computing system 100 of FIG. 1 and/or computing system 200 of FIG. 2) projecting an image (e.g., asset 132 of FIG. 1) having metadata onto a multi-touch surface (e.g., multi-touch surface 106 of FIG. 1 and/or multi-touch surface 206 of FIG. 2) to receive a touch input. In an example, the image is an asset, which is associated with or assigned to a project within the workspace. The method continues to block 508.

At block 508, the method 500 includes the computing system (e.g., computing system 100 of FIG. 1 and/or computing system 200 of FIG. 2) managing the workspace (e.g., workspace 130 of FIG. 1). In examples, the computing system manages the workspace by managing workspace metadata as well as project metadata, project page metadata, and asset metadata. The method continues to block 510, at which point the method 500 ends.

Additional processes also may be included, and it should be understood that the processes depicted in FIG. 5 represent illustrations, and that other processes may be added or existing processes may be removed, modified, or rearranged without departing from the scope and spirit of the present disclosure.

Figure 6A:
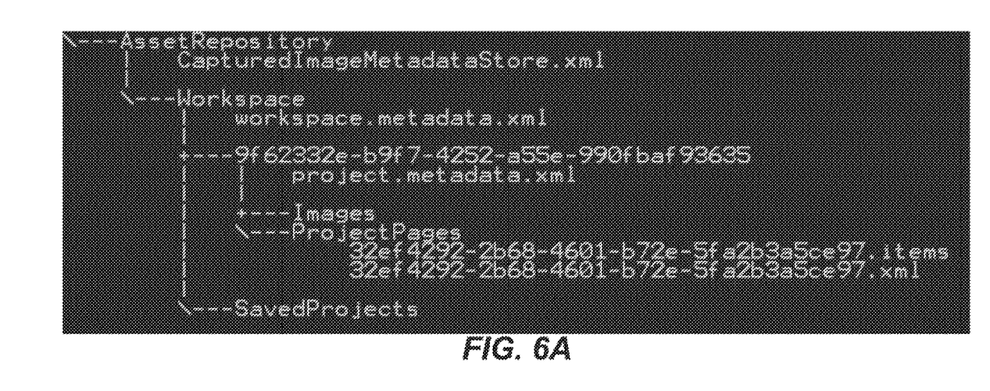
FIGS. 6A and 6B illustrate screenshots of an asset repository structure on a disk drive in an initial state (FIG. 6A) and after creation of assets (FIG. 6B)
Figure 6B:
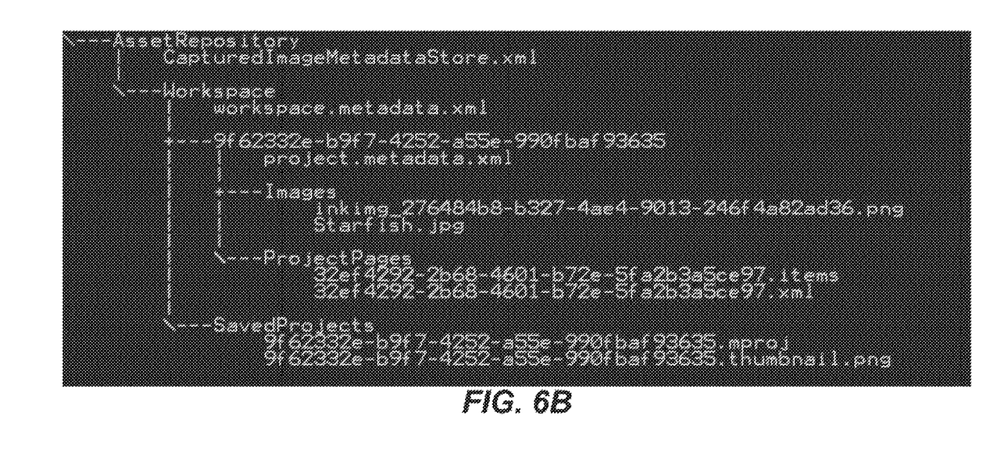

FIGS. 6A and 6B illustrate screenshots of an asset repository structure on a disk drive. In particular, FIG. 6A represents an asset repository structure on a disk drive in an initial state while FIG. 6B represents the asset repository structure after the creation of assets.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A method comprising:
 displaying, by a computing device, a workspace including at least one project on a display;
 in response to a selection of an image from the at least one project on the display, determining, by the computing device, whether a name of the selected image matches a name of an image metadata file in a storage;
 in response to a determination that the name of the selected image matches the name of an image metadata file in the storage, calculating, by the computing device, a hash value of the image metadata file and determining whether the calculated hash value of the image metadata file matches a stored hash value; and
 in response to a determination that the calculated hash value of the image metadata file matches a stored hash value, projecting, by a projector, the selected image and metadata of the image metadata file onto a multi-touch surface to receive a touch input.

2. The method of claim 1, further comprising:
 saving, by the computing device, the metadata of the image projected onto the multi-touch surface.

3. The method of claim 2, wherein saving the metadata of the image further comprises saving, by the computing device, automatically the metadata into a temporary repository on a storage device.

4. The method of claim 2, wherein saving the metadata of the image further comprises saving, by the computing device, the metadata into a non-temporary repository on a storage device responsive to receiving a save command from a user of the computing device.

5. The method of claim 1, further comprising:
 capturing, by the computing device, the image via a capture device.

6. The method of claim 1, wherein the at least one project on the workspace further comprises:
 a plurality of projects, each of the plurality of projects having at least one project page and project metadata.

7. The method of claim 6, wherein each of the at least one project page further comprises:
 associated assets and project page metadata.

8. The method of claim 1, further comprising:
 receiving, by the computing device, a manipulation input on the multi-touch surface to cause the image to be manipulated; and
 manipulating the projected image on the multi-touch surface.

9. A computing system comprising:
 a processing resource;
 a display to display a workspace including at least one project;
 a multi-touch surface;
 a projector; and
 a memory storing instructions that when executed cause the processing resource to:
  in response to a selection of an image from the at least one project on the display, determine whether a name of the selected image matches a name of a stored image metadata file;
  in response to a determination that the name of the selected image matches the name of a stored image metadata file, calculate a hash value of the image metadata file and determine whether the calculated hash value matches a stored hash value; and
  in response to a determination that the calculated hash value of the image metadata file matches a stored hash value, project the selected image and metadata of the image metadata file onto the multi-touch surface to receive a touch input.

10. The computing system of claim 9, wherein the display is in an approximate vertical orientation and wherein the multi-touch surface is in an approximate horizontal position.

11. The computing system of claim 10, wherein the instructions are to cause the processing resource to manage the workspace by managing workspace metadata of the workspace, project metadata of the at least one project, project page metadata of a project page associated with the at least one project, and the metadata of the image metadata file.

12. A non-transitory computer-readable storage medium storing instructions executable by a processor to:
 display a workspace, a project, and a project page on a display, the project page being associated with the project, and the project being associated with the workspace;
 in response to a selection of an image from the project page on the display, determine whether a name of the selected image matches a name of a stored image metadata file;
 in response to a determination that the name of the selected image matches the name of a stored image metadata file, calculate a hash value of the image metadata file and determine whether the calculated hash value matches a stored hash value; and
 in response to a determination that the calculated hash value of the image metadata file matches a stored hash value, project the selected image and metadata of the image metadata file onto a multi-touch surface to receive a touch input.

13. The non-transitory computer-readable storage medium of claim 12, wherein the instructions are to cause the processor to:
 in response to detecting an image downloaded on the display, capture the downloaded image and contour metadata of the downloaded image; and
 store the contour metadata of the downloaded image as the image metadata file.

14. The non-transitory computer-readable storage medium of claim 12, wherein the selected image is representative of an object.

15. The non-transitory computer-readable storage medium of claim 12, wherein the instructions are to cause the processor to:
 save metadata associated with the selected image projected on the multi-touch surface into one of a temporary repository on a storage device and a non-temporary repository on the storage device.

* * * * *